United States Patent [19]

Tomlinson

[11] 4,090,567
[45] May 23, 1978

[54] FIRE FIGHTING HELICOPTER

[76] Inventor: Francis E. Tomlinson, 4701 White Oak, Encino, Calif. 91316

[21] Appl. No.: 735,736

[22] Filed: Oct. 26, 1976

[51] Int. Cl.² .............................................. A62C 27/30
[52] U.S. Cl. .......................................... 169/53; 89/7; 239/171; 244/136
[58] Field of Search .................... 239/171; 169/53, 62; 244/136, 137 R; 89/7, 37.5 R

[56] References Cited

U.S. PATENT DOCUMENTS

| 314,036 | 3/1885 | Marvin | 89/1 F |
|---|---|---|---|
| 387,517 | 8/1888 | Jackson | 89/7 |
| 2,373,990 | 4/1945 | Barnhart | 89/37.5 R X |
| 2,842,031 | 7/1958 | Johnson | 89/37.5 R |
| 3,273,651 | 9/1966 | Andrews | 239/171 X |
| 3,510,107 | 5/1970 | Fidler | 244/137 X |
| 3,897,829 | 8/1975 | Eason | 169/53 |

Primary Examiner—Joseph F. Peters, Jr.
Assistant Examiner—Michael Mar
Attorney, Agent, or Firm—James C. Wray

[57] ABSTRACT

Helicopter fire fighting apparatus includes a large quick-connect and disconnect fire-fighting fluid tank, a pump mounted near the engine, a fire fighting control station on the rear of the helicopter and a nozzle broom swiveled near the control station. A helicopter lands, quickly drops an empty tank and hooks up a full tank before rising to the proper location to fight a fire, such as in an office building. The boom breaks windows for access to the fire, and a hardened water-driven projectile may be propelled from the nozzle boom to break a window.

4 Claims, 4 Drawing Figures

FIRE FIGHTING HELICOPTER

BACKGROUND OF THE INVENTION

In all fire fighting operations, quickly reaching the scene of the fire and attacking the fire greatly improves the chances of restricting the fire and preventing injury, and restricting property damage.

It is particularly valuable to use helicopters in fighting fires in inaccessible areas such as brush and timber areas, freeways, and especially jammed freeways during rush hours and high rise buildings.

Fighting fires in high rise buildings entails unusual problems not encountered in other types of fires. Often conventional and modern apparatus used in fighting fires is inappropriate for fighting fires in high rise buildings. The way in which buildings are constructed and the materials used in the construction at the same time makes fire fighting in high rise buildings difficult and dangerous.

From experience it has been recognized that elevators are inappropriate for use during fires. Aerial ladders may be unable to reach floors where fires occur, and conventional high volume fire fighting fluid delivery equipment may be ineffectual.

Hauling fire fighting equipment up stairways is exhausting and slow and reduces the effectiveness of the fire fighters as they reach the locus of the fire. Often the stairs which are used to reach the scene of the fire also serve oppositely flowing downward evacuation traffic.

It has been said that fighting a serious fire in a high rise building places as much demand on fire departments as major brush fires and that manpower equivalent to an entire fire battalion can easily be commited to a high rise building fire.

A need exists for equipment that can rapidly approach the scene of the fire and begin fire fighting operations quickly.

Historically, fire fighting in high rise buildings has been limited to sprinkler systems or men on the scene. Under recent procedures, men climb stairways with heavy breathing equipment and fire fighting equipment to reach the scene of the fire.

The role of new vehicles, such as helicopters, has been limited chiefly to evacuation and command operations.

Some helicopters have been proposed for fighting ground fires.

U.S. Pat. No. 3,897,829 describes a helicopter forest fire fighting system which uses a mountable tank, pump and boom. The tank is not interchangeable with full tanks; a siphon is used to draw water into the tank when necessary.

U.S. Pat. No. 3,494,423 describes a fire-fighting boom and tanks for mounting on a helicopter.

U.S. Pat. No. 3,481,405 shows a helicopter with a gas generator for fighting fires.

U.S. Pat. No. 2,359,573 shows an example of airborne bombs or projectiles used in fighting fires.

No patent suggests a rear mounted control module and a rear mounted nozzle boom. None describes rapidly interchangeable tanks for connections to helicopters, and none shows hardened nozzle boom or projectiles for propelling from nozzle boom to windows.

At this time there is a clear need for a precision, controlled fire fighting helicopter to combat fires in high rise buildings, freeway accidents, brush, timber areas, and other inaccessible areas. In crowded areas and freeways, for a quick response to control fire and save lives, the use of this type of helicopter is imperative.

SUMMARY OF THE INVENTION

The present invention provides a helicopter firefighting apparatus which has quickly connectable fluid tanks, high pressure pumps mounted near the engine, and fire fighting control stations for controlling an extensible swiveling boom to direct fire fighting fluids precisely to the scene of a fire, for example through windows in high rise buildings.

The helicopter that may be used in this invention is a Sikorsky S64F with the following modifications:

All surfaces and fuel tanks are covered with a heat shield skin for protection. A fire fighters control module is located aft at the bottom of the tail section. One or more detachable tanks are mounted externally on the helicopter to carry fire fighting fluids. The detachable tanks vary in size and weight in relation to the type of fluid contained. The tanks are located midship and are coupled to the helicopter with electrohydraulically controlled hooks or clamps. The tanks use quick-disconnect couplings, high pressure unions and lines that attach to high pressure pumps located midship. The tanks contain various types of fluids depending on the nature of the fire to be put out.

These basically are: water for normal fire fighting, slurry for control of brush or forest fires, additives and chemicals such as Dupont's Halon 1301 for control of fires in high rise buildings or facilities which house expensive equipment or materials. Halon controls fires but does not deplete oxygen.

Vehicles travel on the street or at ground level with extra tanks for the helicopters. As a helicopter depletes its supply of fluid, the auxillary tanks are filled at ground level. The helicopter flys to ground level, quickly disconnects the empty tank, connects a full tank and returns to fire. High pressure pumps located midship are connected to the extendable and retractable nozzle boom. Snorkles are controlled by firemen in the control modules.

The nozzle boom are very much like the nozzle boom used on KC-135 tankers for refueling purposes. Made out of high impact heat resistant plastic, the nozzle boom are extendable and retractable and are electrohydraulically directionally controlled from the fire fighting module.

In the preferred embodiment, the fire control modules are located aft under the tail rotor, and the nozzle boom are swiveled aft near the tail rotor. Preferably, the nozzle boom are aimed sideways with respect to a longitudinal dimension of the helicopter and the speed and pitch of the tail rotor is adjusted to compensate for the active side thrust produced by the high pressure stream emitting from the nozzle boom. Alternatively, the reactive thrust may be balanced by appropriately pitching the craft with the main rotor or by accomodation of the main rotor and tail rotor.

Before a high rise file is approached, a hard projectile is fitted on the tip of the nozzle boom for propelling from the nozzle boom by the impact of the high pressure fluid from the pump. In another form of the invention, the fire fighter may control the insertion of projectiles into the nozzle boom so that the projectiles are propelled through and out of the nozzle boom toward a surface to be penetrated.

Alternatively, the nozzle boom or the tip of the nozzle boom is hardened so that it may be driven against the surface to be penetrated. In one form, the nozzle boom is released in extension so that the high pressure fluid from the pump rapidly extends the nozzle boom, driving its tip against the surface to be penetrated. In another mode, the nozzle boom is either rapidly swung against or extended into the surface.

One object of the invention is the provision of helicopter fire fighting apparatus having rapidly attached and detached external tanks, for fire fighting fluids, a high pressure pump and a nozzle boom extending from the helicopter for directing fluid from the pump to a fire.

Another object of this invention is the provision of a helicopter with a swivel connected between a pump discharge and a nozzle boom whereby the nozzle boom is movable to varied positions on the swivel for discharging fluid in varied directions from the helicopter.

A further object of this invention is the provision of a helicopter fire fighting device with a nozzle boom mounted on a swivel aft on the helicopter.

Another object of the invention is the provision of a control module connected to a helicopter and control means connected to a nozzle boom and to the helicopter for controlling direction of the nozzle boom with respect to the helicopter, and means operable in the control module to command the control means.

Another object of the invention is the provision of a fire fighting control module mounted aft on a helicopter.

Another object of the invention is the provision of a projectile means connected to a nozzle boom for propelling from the nozzle boom upon flow of fluid under high pressure from a pump connected to the nozzle boom.

These and other and further objects of the invention are apparent in the disclosure which include the above and ongoing specification with the claims and the drawings.

DETAILED DESCRIPTION OF THE DRAWINGS

Figure 1:
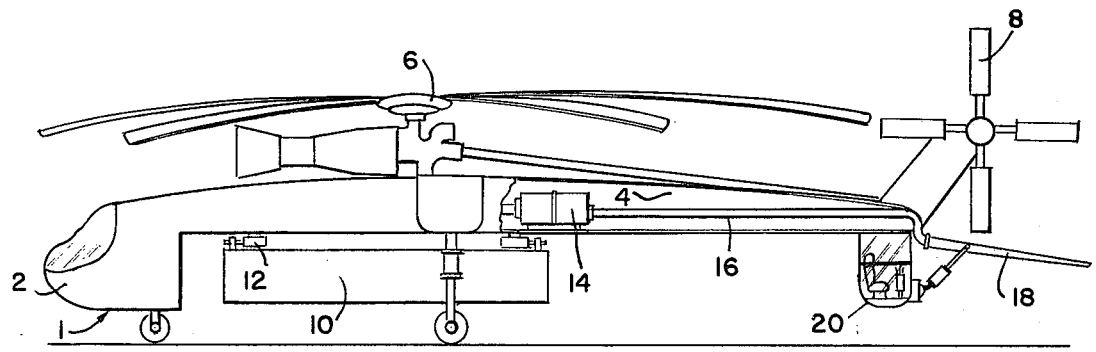
FIG. 1 is a side elevation of a helicopter showing the tank, high pressure pump, control module and nozzle boom.

A fire fighting helicopter is generally indicated by the numeral 1. In a preferred helicopter used with the invention, the vehicle has a forward control portion 2 and a large raised central cargo portion 4. As is conventional, the large helicopter has a main rotor 6 and a tail rotor 8. The fire fighting apparatus on the helicopter comprises a large replacable tank 10 which is connected to the helicopter by rapid disconnect and connect couplings 12. A pump 14 driven by the main helicopter engines draws fluid from tank 10 and discharges the fluid through a discharge line 16. Nozzle boom 18 directs fluid from the helicopter as controlled by a fire fighter seated in module 20.

Figure 2:
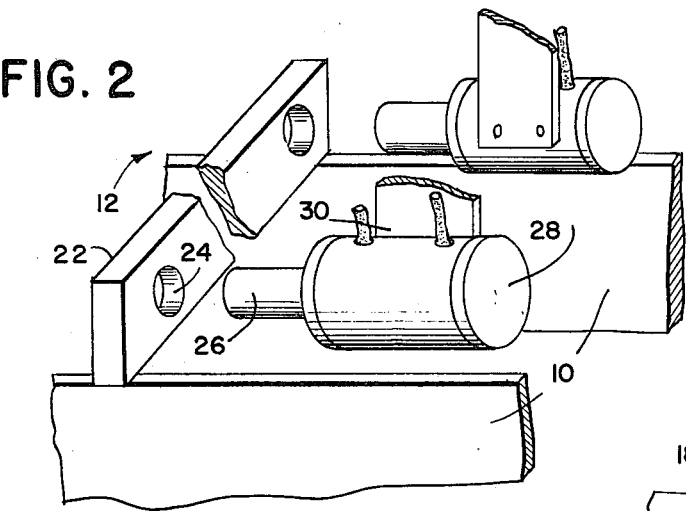
FIG. 2 is a detail of the quick disconnect and connect apparatus for rapidly replacing an empty tank with a full tank.

As shown schematically in FIG. 2, the large fire fighting tank 10 has quick disconnect and connect couplings which are generally referred to by the numeral 12. In one embodiment, the couplings comprise lugs 22 mounted on the top of the tank with holes 24 in the lugs which receive pistons 26 of parallel cylinders 28. The cylinders 28 are double acting to drive the pistons 26 inward to release the tanks and to drive the pistons 26 outward to engage holes 24 in lugs 22.

Cylinders 28 are mounted on lift device 30 in a preferred form of the invention, so the tanks may be lowered to the ground and moved by a towing vehicle. Preferably the tanks are provided with wheels or skids at their base, as is conventional in large tanks.

Figure 3:
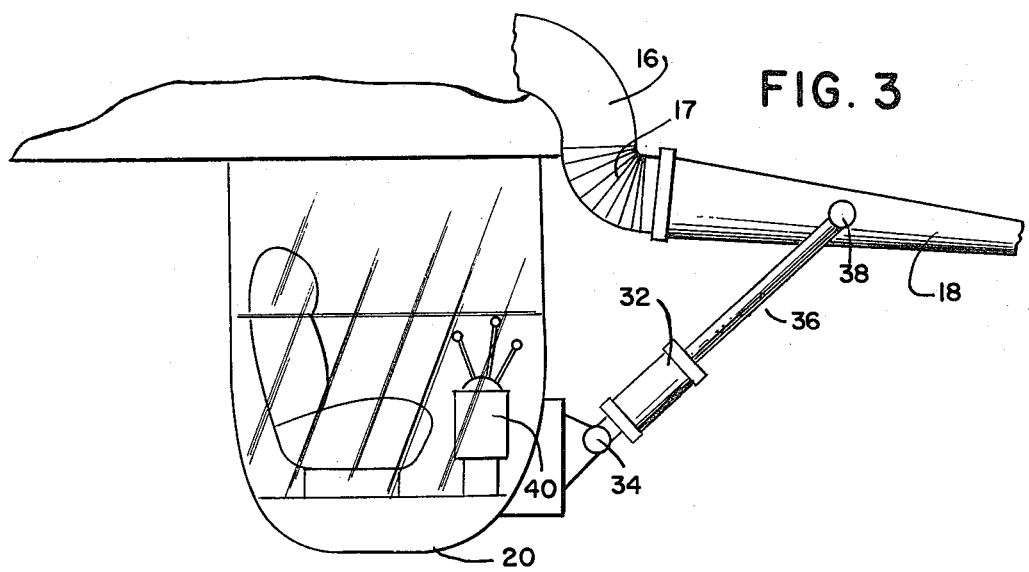
FIG. 3 is a detail of the control module, snorkel and control means for directing the nozzle boom.

As shown in FIG. 3 the snorkel 18 is connected to the discharge pipe 16 through a swivel connection 17. Cylinders 32 are connected to swivels 34 on a fixed position on the helicopter and pistons 36 are connected to pivots 38 on nozzle boom 18 so that the nozzle boom may be moved in any desired direction as controlled by a fire fighter sitting in control module 20. In a conventional manner, the fire fighter moves control lever 40 in the left or right or forward or rearward direction which causes the conventional valves to supply hydraulic fluid to cylinders 32 to move the nozzle boom left and right, up and down.

The movement of the nozzle boom as controlled by control lever 40 uses electrohydraulic operations similar to the operation of many well known devices, for example booms mounted on vehicles, such as backhoe booms.

The weight of the module and nozzle boom and a single person seated within the nozzle boom is balanced by placement of the relatively large and heavy fluid tank slightly ahead of the center of lift of the helicopter.

The module is very much like turrets in military aircraft. In one embodiment of the invention the nozzle boom is fixed on the module for turning with the module, and the nozzle boom and module turn as a unit. In that condition, the vertical rotation of the nozzle boom may be controlled by a single hydraulic cylinder and piston connected between the module and the nozzle boom or between the helicopter and nozzle boom. Alternatively, the nozzle boom is fixed with respect to the module and vertical adjustment of the nozzle boom is accomplished by raising and lowering the entire craft.

Acess to the module 20 is from a door opposite the nozzle boom. Alternatively, acess is through a hatch at the top of the module.

Figure 4:
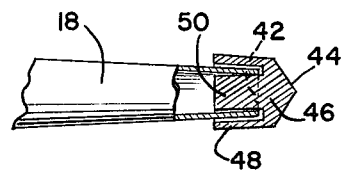
FIG. 4 is a detail of a preferred projectile mounted on the distal end of the nozzle boom.

As shown in FIG. 4, the distal end 42 of nozzle boom 18 is provided with a projectile 44. Projectile 44 has a relatively large head 46 for creating a large opening in the surface to be penetrated and has stabilizing wings 48 which are spaced outwardly from the end of the nozzle boom. Central portion 50 of the projectile extends into nozzle boom 18 in sealing relationship therewith whereby the projectile is popped out of the nozzle boom at a high velocity when pressure from the pump is initially applied through the nozzle boom. Alternatively, the end of the nozzle boom may be provided with a solenoid release, which engages wings 48 of the projectile while pressure builds up in the nozzle boom until the projectile is intentionally released by operation of the solenoid.

While the invention has been described with reference to a specific enbodiment, modifications and variations of the invention may be made without departing from the scope of the invention.

The scope of the invention is defined in the following claims.

I Claim:

1. Fire fighting helicopter apparatus comprising a helicopter, tank attachment means connected to the helicopter for rapidly attaching and detaching external tanks, an external fire fighting fluid tank connected to the tank attaching means, a high pressure pump mounted amidship, pump driving means mounted on the helicopter and connected to the pump for driving the pump, suction means connected to the pump and to the tank for drawing fluid from the tank into the high pressure pump, a discharge line connected to the pump and extending through the helicopter, a nozzle boom connected to the discharge line and extending from the helicopter for directing fluid from the pump to a fire, swivel means mounted rearwardly on the helicopter and connected between the discharge line and the nozzle boom whereby the snorkel is movable horizontally and vertically to varied positions by the swivel means for discharging fluid in varied directions from the helicopter a control module mounted aft on the helicopter adjacent the swivel means, said tank being positioned sufficiently forward in the helicopter to counterbalance the control module, and means operable in the control module for controlling said swivel means.

2. The apparatus of claim 1 wherein the pump is connected to the helicopter engine for direct drive by the engine.

3. Fire fighting helicopter apparatus comprising a helicopter, tank attachment means connected to the helicopter for rapidly attaching and detaching external tanks, an external fire fighting fluid tank connected to the tank attaching means, a high pressure pump mounted amidship, pump driving means mounted on the helicopter and connected to the pump for driving the pump, suction means connected to the pump and to the tank for drawing fluid from the tank into the high pressure pump, a discharge line connected to the pump and extending through the helicopter, a nozzle boom connected to the discharge line and extending from the helicopter for directing fluid from the pump to a fire, projectile means removably connected to the end of the nozzle boom remote from the helicopter for propelling from the nozzle boom upon flow of fluid under high pressure from the pump wherein the projectile means comprise a relatively large head portion substantially covering the end of the nozzle boom, a central portion connected to the head portion and extending into the end of the nozzle boom in sealing relation therewith, and wing portions connected to the head portion and spaced outwardly from the end of the nozzle boom.

4. The apparatus of claim 3 further comprising release means connected to the projectile means for holding the projectile means on the end of the snorkel upon flow of fluid under pressure from the pump.

* * * * *